United States Patent
van Diggelen et al.

(10) Patent No.: US 6,590,530 B2
(45) Date of Patent: *Jul. 8, 2003

(54) METHOD AND APPARATUS FOR ENHANCING A GLOBAL POSITIONING SYSTEM WITH A TERRAIN MODEL

(75) Inventors: Frank van Diggelen, San Jose, CA (US); Charles Abraham, San Jose, CA (US)

(73) Assignee: Global Locate, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/093,215

(22) Filed: Mar. 7, 2002

(65) Prior Publication Data

US 2002/0089446 A1 Jul. 11, 2002

Related U.S. Application Data

(62) Division of application No. 09/811,796, filed on Mar. 19, 2001, now Pat. No. 6,429,814.
(60) Provisional application No. 60/249,604, filed on Nov. 17, 2000.

(51) Int. Cl.$^7$ ................................................ H04B 7/85
(52) U.S. Cl. .............................. 342/357.13; 342/357.01
(58) Field of Search ........................ 342/357.13, 357.06, 342/357.01, 462

(56) References Cited

U.S. PATENT DOCUMENTS

| | | | | |
|---|---|---|---|---|
| 4,949,268 A | * | 8/1990 | Nishikawa et al. | 364/449 |
| 4,954,837 A | * | 9/1990 | Baird et al. | 342/458 |
| 5,087,919 A | * | 2/1992 | Odagawa et al. | 342/357 |
| 5,596,500 A | * | 1/1997 | Sprague et al. | 364/449.7 |
| 5,995,903 A | * | 11/1999 | Smith et al. | 701/211 |
| 6,047,227 A | * | 4/2000 | Henderson et al. | 701/50 |
| 6,061,018 A | | 5/2000 | Sheynblat | 342/357.06 |
| 6,094,607 A | * | 7/2000 | Diesel | 701/4 |
| 6,157,891 A | * | 12/2000 | Lin | 701/301 |
| 6,252,543 B1 | * | 6/2001 | Camp | 342/357.08 |
| 6,259,403 B1 | * | 7/2001 | Nichols | 342/357.14 |
| 6,429,814 B1 | * | 8/2002 | van Diggelen et al. | 342/357.13 |

OTHER PUBLICATIONS

M. Cameron, A. Brown, "Intelligent Transportation System Mayday Becomes a Reality", IEEE, 1995, pp. 340–347.

* cited by examiner

*Primary Examiner*—Dao Phan
(74) *Attorney, Agent, or Firm*—Moser, Patterson & Sheridan, LLP

(57) ABSTRACT

A method and apparatus that computes three-dimensional position using a terrain model and pseudorange measurements that are computed satellite signals. The pseudorange measurements provide a set of possible positions and the terrain model is used to identify the correct position amongst the possible positions.

15 Claims, 8 Drawing Sheets

METHOD AND APPARATUS FOR ENHANCING A GLOBAL POSITIONING SYSTEM WITH A TERRAIN MODEL

CROSS-REFERENCE TO RELATED APPLICATIONS

This application is a divisional of U.S. patent application Ser. No. 09/811,796, filed Mar. 19, 2001, now U.S. Pat. No. 6,429,814 which claims benefit of U.S. provisional patent application Ser. No. 60/249,604, filed Nov. 17, 2000. Each of the aforementioned related patent applications is herein incorporated by reference.

BACKGROUND OF THE INVENTION

1. Field of the Invention

The invention relates to positioning systems. More particularly, the invention relates to a method and apparatus for enhancing a global positioning system using terrain model information.

2. Description of the Related Art

A positioning receiver for the Global Positioning System (GPS) uses measurements from several satellites to compute position in three dimensions (i.e., latitude, longitude, and altitude). In general the process for determining position requires signals to be received and processed of at least four satellites in order to solve for the four unknowns of three-dimensional position as well as a common mode timing error.

Most commercial GPS receivers offer a fixed altitude mode for situations where the altitude of the receiver is available from external means (for example input by the user as a parameter). Provided the externally supplied altitude value is accurate, the receiver can compute an accurate latitude and longitude using signals from only three satellites. Any error in the specified altitude will, however, cause an error of the same magnitude in computed horizontal position. The fixed altitude mode is therefore very useful in applications such as navigation at sea since sea level is both uniform over large regions and well known through published computer models. In terrestrial applications, however, a fixed altitude solution has limited utility since the operator cannot always know or supply an accurate altitude.

Recently, GPS has been proposed as a location technology solution for wireless devices such as cellular telephones. In these systems, the wireless device is typically in communication with a terrestrial transceiver (radio tower) that is within a few miles or kilometers of the wireless device. It may be feasible to model the region covered by the terrestrial transceiver by making use of the known altitude at the radio tower. In this case, this altitude can be introduced into the GPS processing to allow for a fixed altitude solution.

The fixed altitude technique, while useful in some situations, cannot address the general problem of determining position over uneven and/or unknown terrain.

Therefore, a need exists in the art for a method and apparatus for enhancing a GPS receiver such that the receiver provides an accurate three-dimensional position using the signals from only three satellites.

BRIEF DESCRIPTION OF THE DRAWINGS

To facilitate understanding, identical reference numerals have been used, where possible, to designate identical elements that are common to the figures.

DETAILED DESCRIPTION OF THE PREFERRED EMBODIMENT

Figure 1:
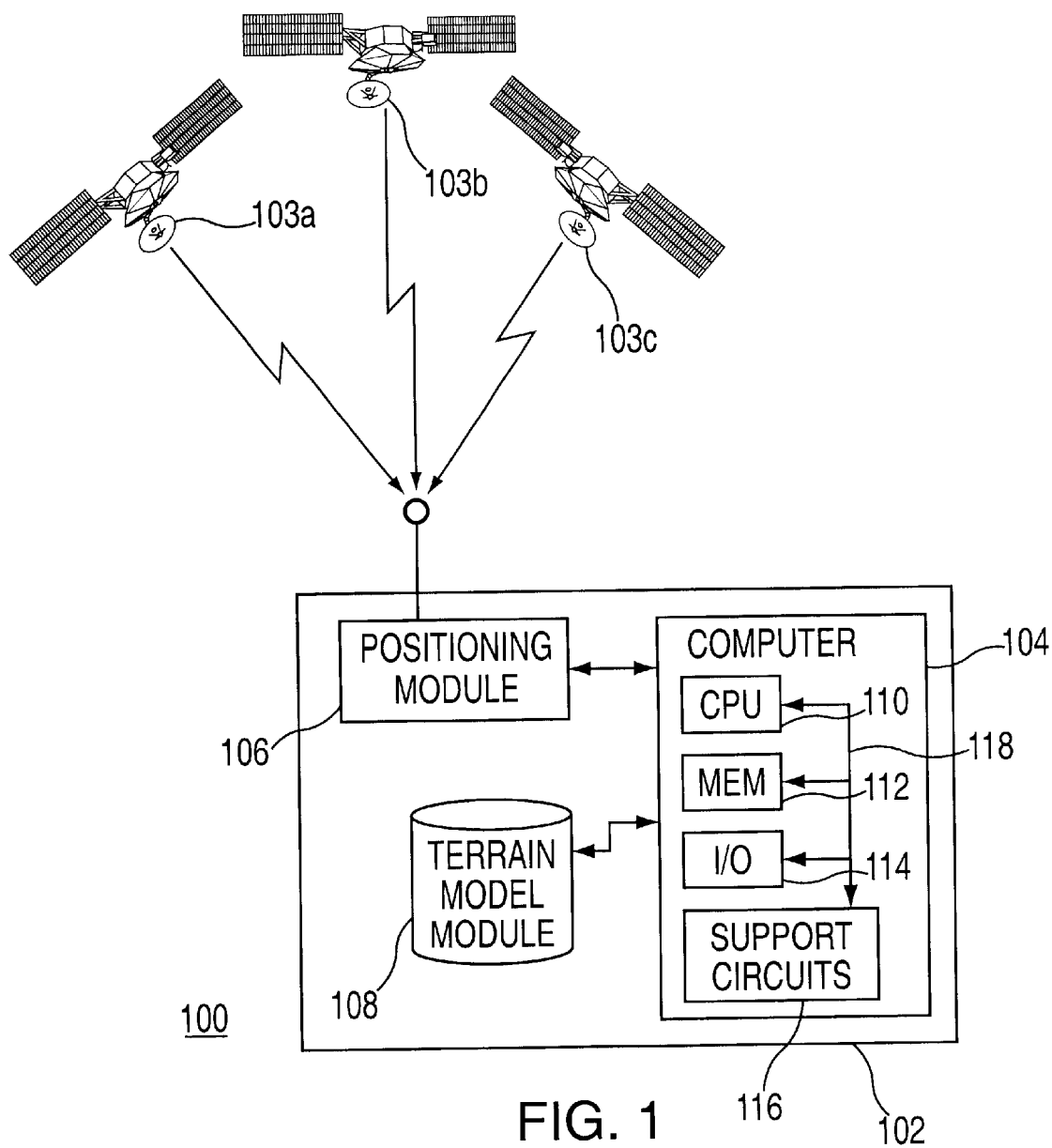
FIG. 1 shows a block diagram of one embodiment of a positioning system.

FIG. 1 depicts a positioning system 100, such as a global positioning system (GPS), in which the location of a receiver 102 can be determined using signals from three satellite transmitters 103a, 103b, and 103c. The receiver 102 combines the signals received from the satellites with the terrain model to compute an accurate three-dimensional position for the receiver 102.

More specifically, the positioning system 100 includes a plurality of satellite transmitters (e.g., three GPS satellites 103a, 103b, and 103c are depicted) and a GPS receiver 102 that is enhanced with the method and apparatus of the present invention. The receiver 102 comprises a computer or computing device 104, a positioning module 106, and a terrain model module 108. The positioning module (a position processor) processes signals that are received from the satellites to determine the position of the receiver. The terrain model module 108 is a database that contains stored data relating to the elevation of different points on the surface of the earth. The terrain model module 108 is generally stored locally within memory of the GPS receiver. Alternatively, the terrain model, or portions thereof, can be downloaded into the receiver via a communications link, as needed.

The computer or computing device 104 is envisioned to be a microprocessor, a microcomputer, a general purpose computer, an electronic circuit, a networked computer, a digital signal processor or any other known suitable type of computing device or combination of circuits. The computer 104 comprises a central processing unit (CPU) 110, a memory 112, an input/output interface (I/O) 114, support circuits 116, and a bus 118. The CPU 110 performs the processing and arithmetic operations for the computer 104. The computer 104 processes the output of the positioning module 106 in combination with the terrain model 108 and produces an accurate position for the receiver.

The memory 112 may comprise random access memory (RAM), read only memory (ROM), disk drive storage, removable storage, or any combination thereof that store the computer programs including operands, operators, dimensional values, configurations, and other data and computer instructions that are used to control the operation of the GPS receiver. The bus 118 provides for digital information transmissions between CPU 110, support circuits 116, memory 112, I/O 114, and other portions of the receiver 102.

I/O 114 provides an interface to control the transmissions of digital information between each of the components in computer 104, and between the components of the computer 104 and different portions of the receiver 102. Support circuits 116 comprise well known circuits such as clocks, cache memory, power supplies, and the like.

Figure 2:
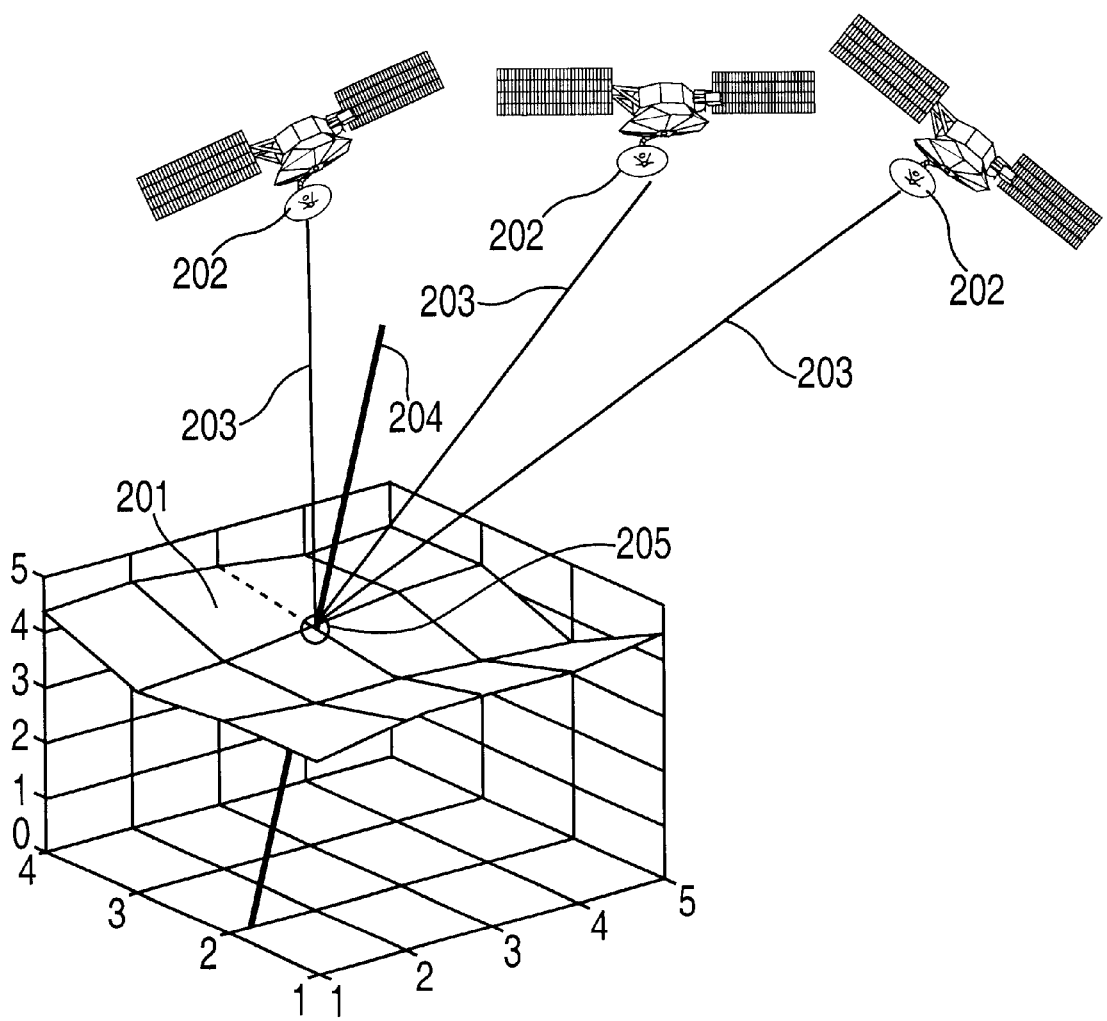
FIG. 2 illustrates the geometry associated with the use of the positioning system of FIG. 1 to compute a position.

FIG. 2 illustrates the geometry associated with the use of the positioning system 100 of FIG. 1 to compute a position. The terrain model 108 provides a grid of altitude values for each latitude and longitude location on the earth's surface. The receiver 102 is assumed to reside on the surface of the earth 201 specified by the model, or at some known offset above the surface. The receiver 102 receives signals from transmitters on satellite 103a, 103b and 103c, and makes pseudorange measurements (represented by arrows 203) that correspond to the distance from the receiver 102 to each transmitter 103a, 103b, and 103c.

In the present invention, only three pseudorange measurements are needed to compute an accurate three-dimensional location and common mode timing error. The positioning module 104 processes the satellite signals to produce a set of possible locations that form an arc 204. The arc 204 represents the compilation of distinct locations in which three pseudoranges are satisfied. The arc 204 thus represents the set of possible solutions through a span of assumed altitudes.

The arc 204 intersects the surface 201 of the earth at a single point 205. Point 205 represents the only possible solution that fits the three pseudorange measurements and also the same altitude as a receiver positioned on the earth's surface. Thus, by identifying altitude of the receiver using the terrain model, it is possible to accurately locate the receiver using signals from only three satellite transmitters.

Figure 3:
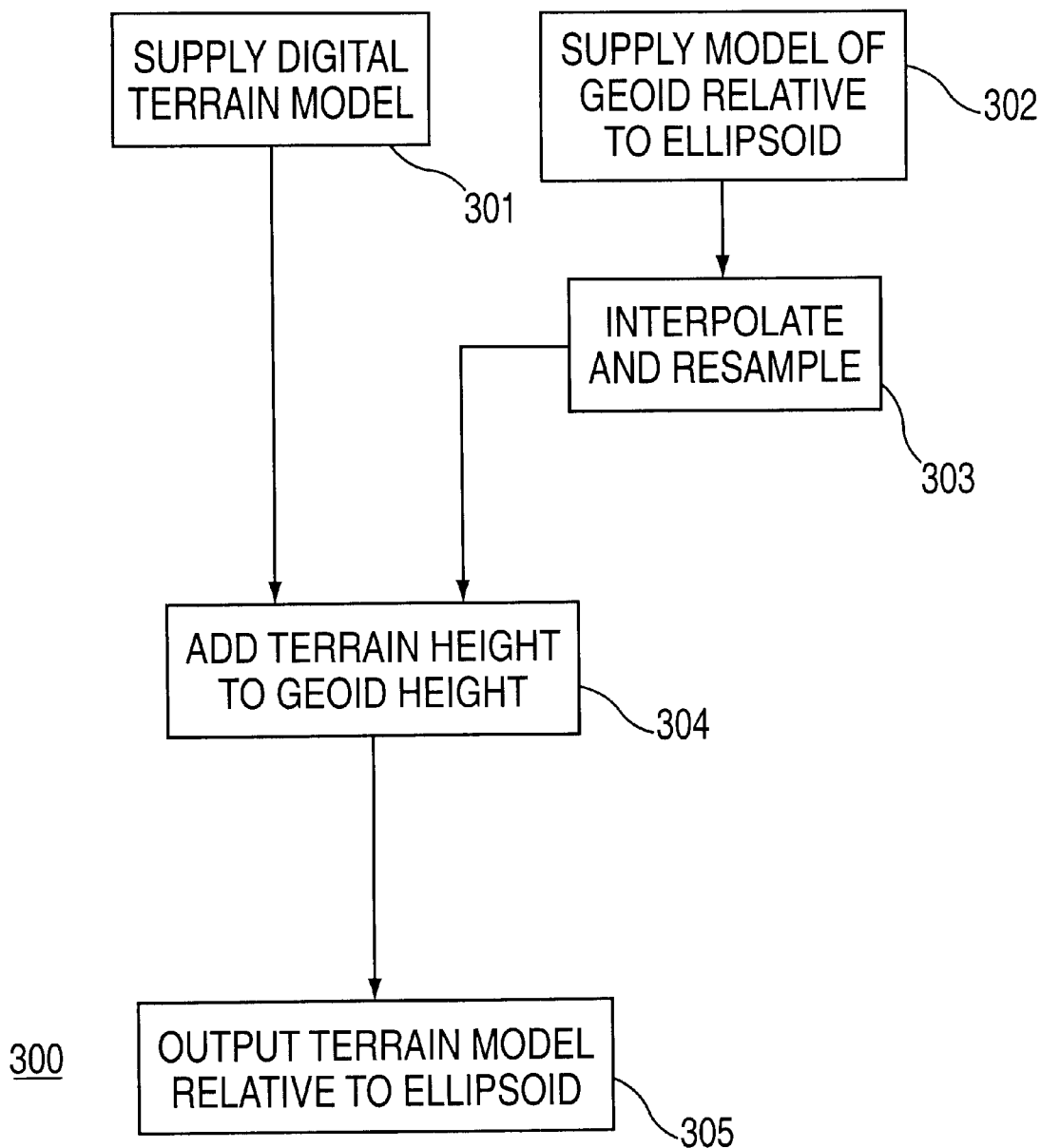
FIG. 3 shows one embodiment of method to derive a terrain model that is used by the system of FIG. 1.

FIG. 3 illustrates a process 300 used by a computer in preparing a terrain model for use in receiver 102 of FIG. 1. A geoid and an ellipsoid are types of geometric models corresponding to the surface of the earth that can be utilized by the GPS receiver of the present invention to determine position. The ellipsoid model approximates the surface of the earth at sea level, but may vary from the actual sea level value by as much as 1000 meters at any specific location on earth. The geoid model describes the position of the earth at sea level more accurately than the ellipsoid, and is modeled relative to the ellipsoid. For example, the geoid model varies from the actual sea level value by less than about 10 meters. The geoid model describes the earth's surface as a grid pattern such that each point is spaced from the adjacent points by a distance of approximately 20 miles.

In FIG. 3, the method 300 begins, at step 301, by supplying a digital terrain model of the earth, or a relevant portion thereof. One such digital terrain model is available from the U.S. Geological Service. The terrain model consists of a grid of height values indicating the height of the terrain relative to mean sea level. The model has points spaced on a grid of 0.5 minutes of latitude and longitude (less than one square kilometer). A total of approximately one billion data points in the terrain model are required to make up the complete model for the entire earth.

At step 302, the method 300 supplies a well-known model of the geoid relative to the ellipsoid, i.e., a model of sea level relative to the center of the earth. To obtain a terrain model that is relative to the center of the earth, the geoid model is combined with the digital terrain model. However, the grid points of each model differ and can not be readily combined. As such, the geoid model is interpolated and resampled to derive grid points that "line up" with the grid points of the terrain model. In step 303, the geoid model is interpolated between grid points and the interpolated surface is resample at locations that are the same as the grid points in the digital terrain model.

In step 304, the values of the digital terrain model are added to the resampled geoid model values to yield the combined geoid-terrain model that approximates the level of the earth's surface. This model is referred to as a terrain model that is stored, at step 305, in the GPS receiver 102 of FIG. 1 in whole or in part.

Figure 4:
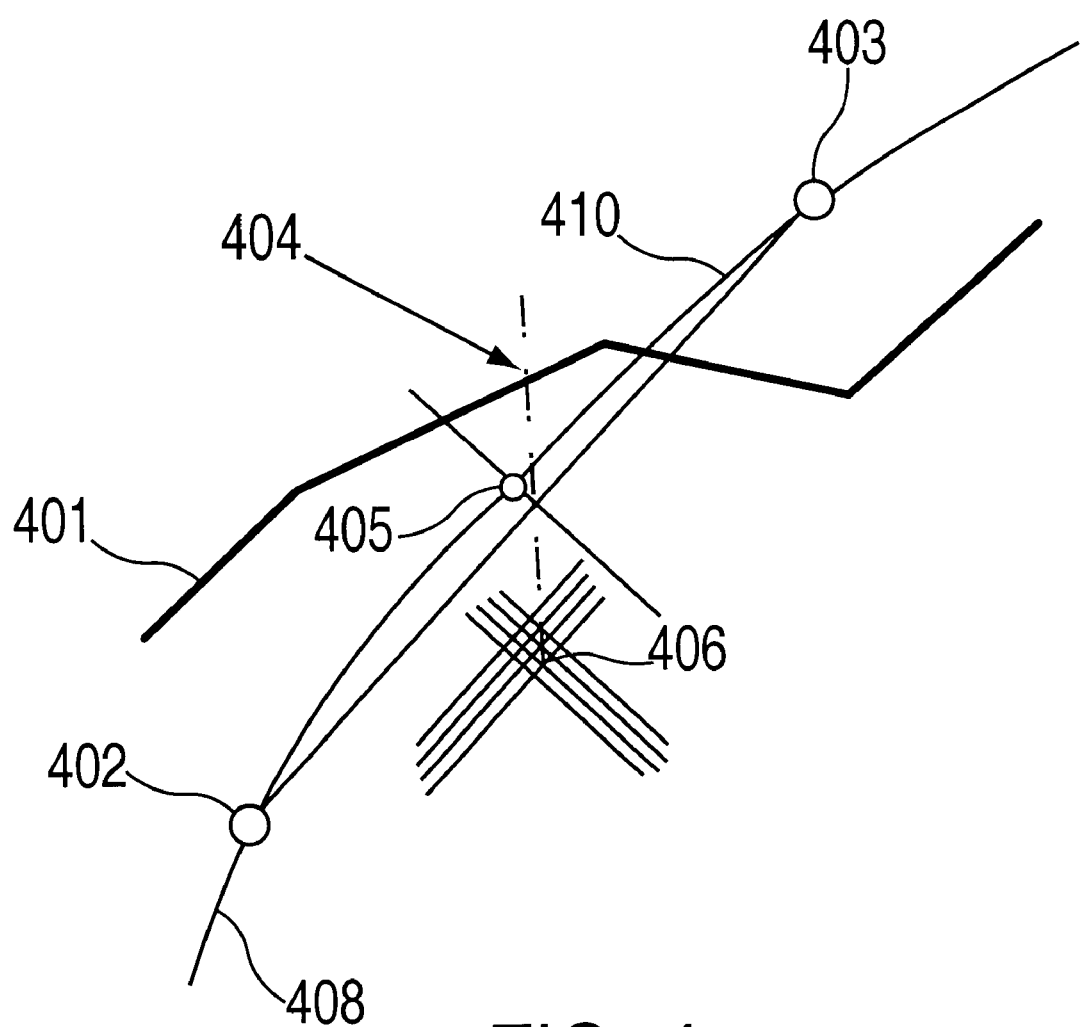
FIG. 4 graphically illustrates this use of the terrain model for determining a three-dimensional location for a GPS receiver.
Figure 5:
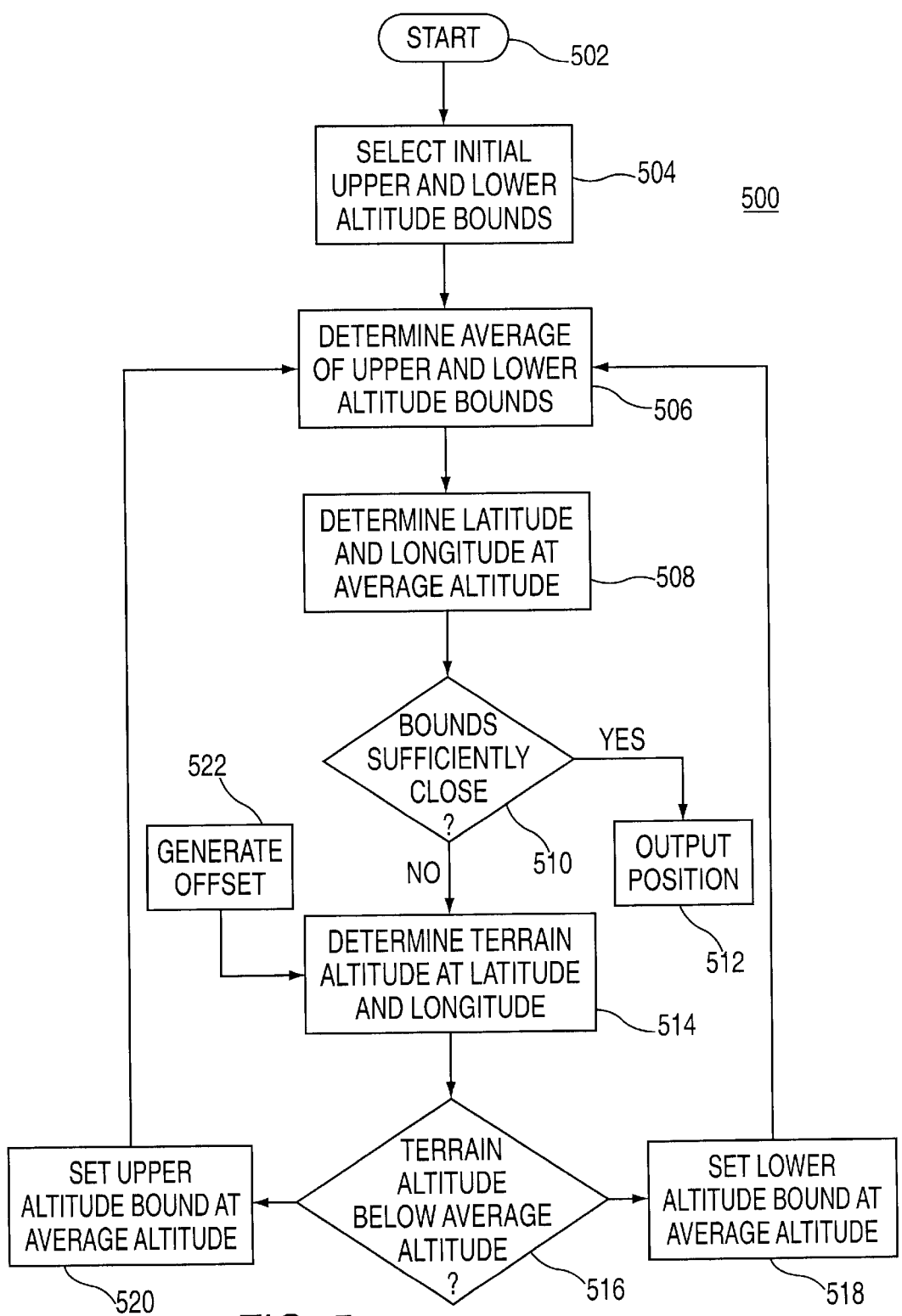
FIG. 5 a flow diagram for a method of computing a position in accordance with the present invention.

FIG. 4 graphically illustrates this use of the terrain model for determining a three-dimensional location for a GPS receiver and FIG. 5 depicts a flow diagram of a method 500 of computing a position using the terrain model. To best understand the operation of method 500 as executed by the computer within the GPS receiver 102, the reader should simultaneously refer to FIGS. 4 and 5 while reading the following description. The method 500 uses an iterative technique in which, during each iteration, ranges of elevation in which the receiver is not located are eliminated from the possible locations to yield a revised set of possible locations at which the receiver may be located. The method is repeated until a single solution is found.

The method 500 begins at step 502 and proceeds to step 504 wherein the method selects two altitude boundary values (an initial upper bound 403 and an initial lower bound 402) along the arc 408 of possible solutions. The arc 408 is depicted in an illustrative, oversized manner to clearly show its relationship t the upper and lower bounds. In actuality, the arc has a relatively large radius such that the arc is nearly a straight line between the upper and lower bounds 403 and 402.

The upper and lower bounds 403 and 402 are known to be above and below the earth's surface 401 in the region of interest. The upper and lower altitude bounds 403 and 402 correspond to two possible position solutions. The exact altitudes chosen is unimportant provided the upper bound altitude and the lower bound altitude are respectively above and below the actual altitude of the terrain. For example the upper altitude bound could be taken as a height above the highest point on earth (for example: 9,000 meters) and the lower altitude bound as a height below the lowest point on earth (for example: −400 meters). Each of these bounds is therefore valid for all elevations on earth since the altitude of each surface location on earth is between the two bound values. If closer bounds values are known by using local constraints such as all the terrain within a specific region has an altitude under 5000 feet, then it takes fewer iterations to reach the desired altitude value to complete the determination of the height of the receiver.

A line that extends between the two solutions must pass through the surface defined by the model since the boundary values are initially chosen to be above and below the surface. At step 506, the line 410 is bisected at a point 405 that represents an average altitude between the upper bound 403 and the lower bound 402. At step 508, using this average altitude, a latitude and longitude is determined that corresponds to the average altitude.

As shall be described further below, after each iteration of the steps that determine the average altitude 405, the method replaces either the upper bound or the lower bound by the average altitude, the upper and lower bounds are closer to each other than prior to the iteration. The location at which the receiver is located remains between the new upper and lower bounds. As such, the true altitude is more closely bounded by each iteration of revised solutions for altitudes 402, 403. The method continues in an iterative fashion until the upper and lower bounds are sufficiently close to provide a position within the desired accuracy of the user, i.e., the query at step 510 is answered affirmatively indicating that the difference between the upper bound and lower bound is less than a predefined value (Δ). When the query at step 510 is affirmatively answered, the method stops at step 512 and outputs the position. Consequently, after a sufficient number of iterations have been performed (the number of iterations that are necessary to yield a desired bound distance may be computed as described below), a close approximation to the intersection of the surface and the set of possible solutions is derived.

At step 514, the latitude and longitude are used to determine an altitude 404 at that point in the terrain model. At step 516, the altitude 404 from the terrain model is compared to the average altitude 405 to determine if the terrain at that point lies below the average altitude 405. If the terrain altitude 404 is above the average altitude 405 then, at step 518, the lower altitude bound 402 is replaced by the average altitude 405. If the terrain altitude 404 is below the average altitude 405, then, at step 520, the upper altitude bound 403 is replaced by the average altitude 405. The method 500 then proceeds from either steps 518 or 520 to step 506. The updated values of upper and lower bounds are then processed to achieve a more accurate altitude solution.

The above description assumed, for simplicity of exposition, that the arc 408 intersected the terrain model at only one point. In almost all cases this will be true, but it is possible to get a situation where the arc 408 intersects the terrain model at two or more points. The arc 408 is typically near vertical. As such, the arc can only intersect the terrain model more than once when the terrain is very steep. In this rare case there are two things to note about the method 500:

1) The method will still converge to give a location that corresponds to an intersection of the arc 408 and the terrain model; this is because the method 500 always chooses an upper and lower bound of at least one intersecting point, even if the arc intersects the terrain model more than once.

2) The error in the computed latitude and longitude will be small, since, as noted above, this rare situation (of multiple intersections of the terrain model by the arc 408) occurs when the terrain is very steep, and so any particular change in altitude, along a locus of rapidly changing altitudes, corresponds to a small change in latitude and longitude.

The method of the present invention may be applied to position location applications where the height of the mobile device is offset from the surface of the earth by a known amount. For example, a mobile device carried in a car would be offset from the surface of the earth by a fixed amount of, e.g., about one meter. The concepts described herein still apply once this offset is taken into account by adding the offset to the terrain model altitude. The offset may also be dynamically assigned based upon the known habits of the user. For example, if a person works in a high-rise office tower located at a particular latitude and longitude, an offset can be generated that represents the height of the floor of the building in which the user works. This offset would be produced and used when the user is located at the latitude and longitude of the building. The optional offset is generated at step 522 of method 500. The offset is added to the terrain altitude that is determined in step 514. This offset adjusted altitude is then used in the computation of altitude as discussed above with respect to steps 516, 518, and 520.

An advantage of method 500 is its simplicity and the fact that the number of iterations to converge can be determined in advance. In fact, the number of iterations required is based on the equation:

$$N=1+\text{floor}(\log_2(\text{Upper minus lower bound}/\Delta)) \qquad [1]$$

where "floor" denotes rounding down,
example: floor(1.8)=1.

For example, if the initial bounds are 1000 m apart, and the desired tolerance limit Δ is 10 m, this equation is solved to yield N=7. The current invention also utilizes the terrain model when more than the minimum three satellites are available, i.e., when four or more satellite signals are available and the GPS receiver can produce a three-dimensional position, the terrain model can be used to enhance the accuracy of the result or assure the result is accurate. The model provides an additional constraint that effectively adds a degree of freedom to the position solution. As will be explained below, this can both improve accuracy and add the ability to isolate and remove erroneous measurements.

In the preferred embodiment, the knowledge of altitude improves accuracy as follows. In a GPS solution, the standard deviation of the horizontal error is characterized by a quantity known as high dilution of precision (HDOP). By definition, HDOP multiplied by the standard deviation of measurement errors gives the standard deviation of horizontal error. If one of the unknown states (e.g., altitude) is removed (i.e., the altitude is fixed to an accurate, known, value), then the value of HDOP decreases.

The knowledge of altitude adds to the ability to isolate and remove erroneous satellite measurements in many ways. In one embodiment, standard in the art, a-posteriori residuals are formed. The magnitude and relative values of these residuals provides information about the quality of the satellite measurements. As is well known, the benefit of the residuals increases as the number of degrees of freedom increase. The number of degrees of freedom is the number of known distances to fixed locations (e.g. pseudoranges for GPS systems) minus the number of unknown states. Thus by decreasing the number of unknown states by fixing altitude to a known value, the number of degrees of freedom is increased.

There are many other techniques in which the current invention can be used to identify erroneous satellites. For example, if there are enough satellites, a three dimensional position can be computed from the satellite measurements. This three dimensional position is then compared to the terrain model value at the same latitude and longitude. Close agreement between the three-dimensional position computation and the terrain model value indicates good accuracy of the computed positional information. Considerable differences between the three-dimensional position computation and the terrain model value indicates one or more erroneous positional measurements. Similarly there are many techniques for removing the erroneous measurements, including iterating over possible combinations of satellite measurements, to find those which produce close agreement with the terrain model.

Any similar iterative techniques to position an object along a single line can be utilized in the present system.

In a GPS receiver, at times, a computation of position is performed using incorrect data, i.e., an incorrectly computed pseudorange. Obviously, such errors can cause the position to be inaccurate. The present invention includes a method for assuring that a computed position is accurate. The method uses a terrain database to assure the quality of a computed position. This method is executed within the computer processor of a GPS receiver, e.g., computer 104 of FIG. 1.

Figure 6:
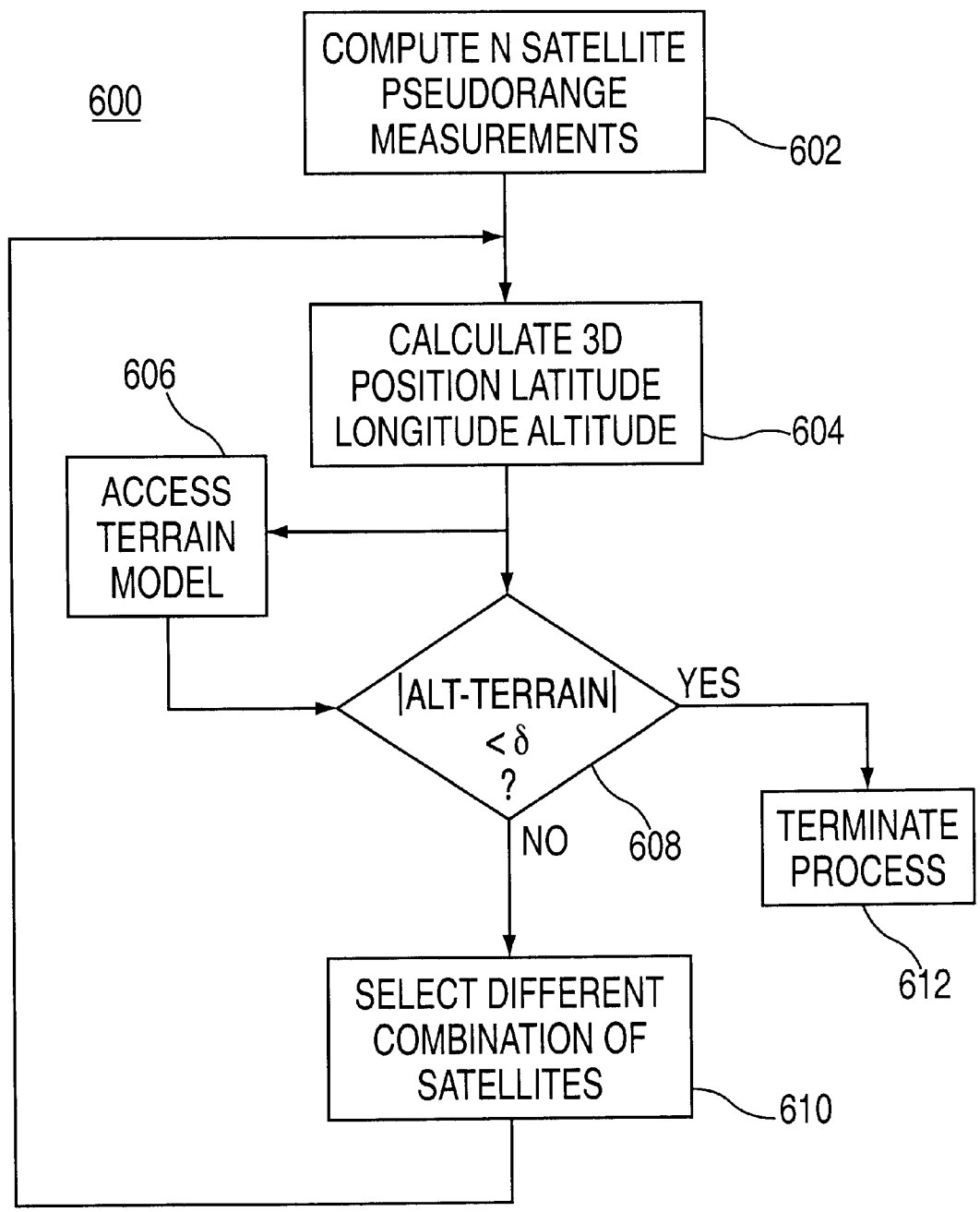
FIG. 6 depicts a flow diagram of a quality assurance method.

FIG. 6 shows an embodiment of quality assurance method 600 in which a GPS altitude derived for a specific location using a GPS system can be compared to a terrain model altitude using a terrain model. The quality assurance method 600 tests the accuracy of the positional results provided by the positioning system 100.

The quality assurance method 600 starts with step 602 in which N satellite measurements, i.e., pseudoranges, are obtained. Following step 602, the method 600 continues to step 604 in which a subset of N measurements are used to compute a three-dimensional position of the receiver including latitude, longitude and altitude. For example, the signals from five satellites may be received and four of those signals are used to compute the latitude, longitude and altitude of the receiver. In step 606, using the latitude and longitude computed in step 602, a terrain model is accessed to determine an altitude at the latitude and longitude, i.e., terrain altitude.

Using input from steps 606 and 604, the method 600 continues to step 608. In step 608, the altitude as computed using the GPS satellite signals is compared with the altitude identified by the terrain data. If the difference in altitude between the value derived in step 606 and the altitude value derived in step 604 is within a prescribed range (e.g., less than δ), the query in step 608 is affirmatively answered, then, at step 612, the measured and computed positions pass the quality assurance check and the method 600 is terminated. If the query at step 608 is negatively answered, then the measurements and/or the computed position derived from the measurements are likely faulty, and the method 600 continues to step 610. In step 610, a different combination of GPS satellite signals is utilized to compute a new position. The new measurement values in step 610 are used in another iteration of method 600 to once again compare the altitudes computed using the GPS signals with the altitude computed using the terrain model. As such, the terrain model is used to remove erroneous measurements from the position calculation.

The foregoing method can be used to benefit any error isolation technique by adding altitude information that would otherwise not be available.

Figure 7:
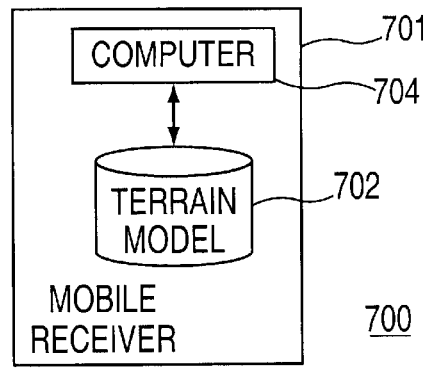
FIG. 7 shows a block diagram of an embodiment of a mobile receiver.

FIG. 7 illustrates an embodiment of a positioning system 700 that is used in conjunction with a portable mobile device 701, such as a hand-held GPS device. In this case, the terrain model 702 (or a local subset thereof) is stored within the portable mobile device 701. The positional computation utilizing the terrain model takes place within the mobile device 702 using computer 704.

Figure 8:
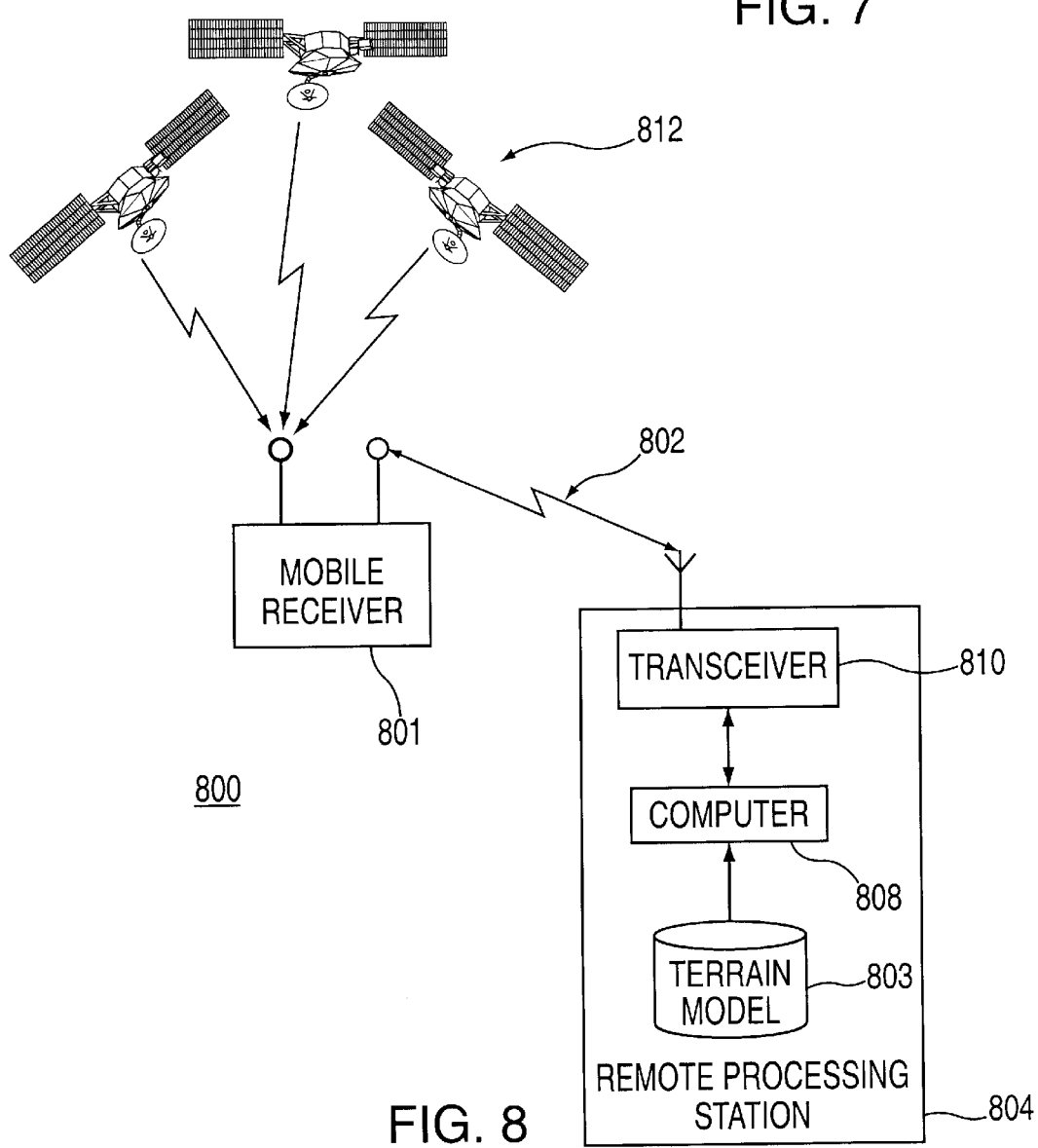
FIG. 8 shows a block diagram of another embodiment of the present invention.

FIG. 8 illustrates an embodiment of positioning system 800 involving a wireless system. This positioning system 800 provides positional information to wireless devices such as cellular phones using GPS technology. In these wireless systems, the wireless device 801 is in communication with a terrestrial transceiver 810 that is typically positioned within a few miles of the wireless device. In this case, the position computation involving the terrain model occurs remotely from a mobile receiver 801. Specifically, the mobile receiver 801 obtains pseudorange information from several GPS satellites 812. This pseudorange information is transferred via a wireless link 802 to the remote processing station 804. The station 804 comprises a position computer 808 and a terrain model 803. The computer 808 within the station 804 performs the process of determining position using the terrain model 803. The resulting position of the mobile receiver 801 is either sent to the mobile receiver 801 via the wireless link 802, or passed on to other users of the positioning information.

Figure 9:
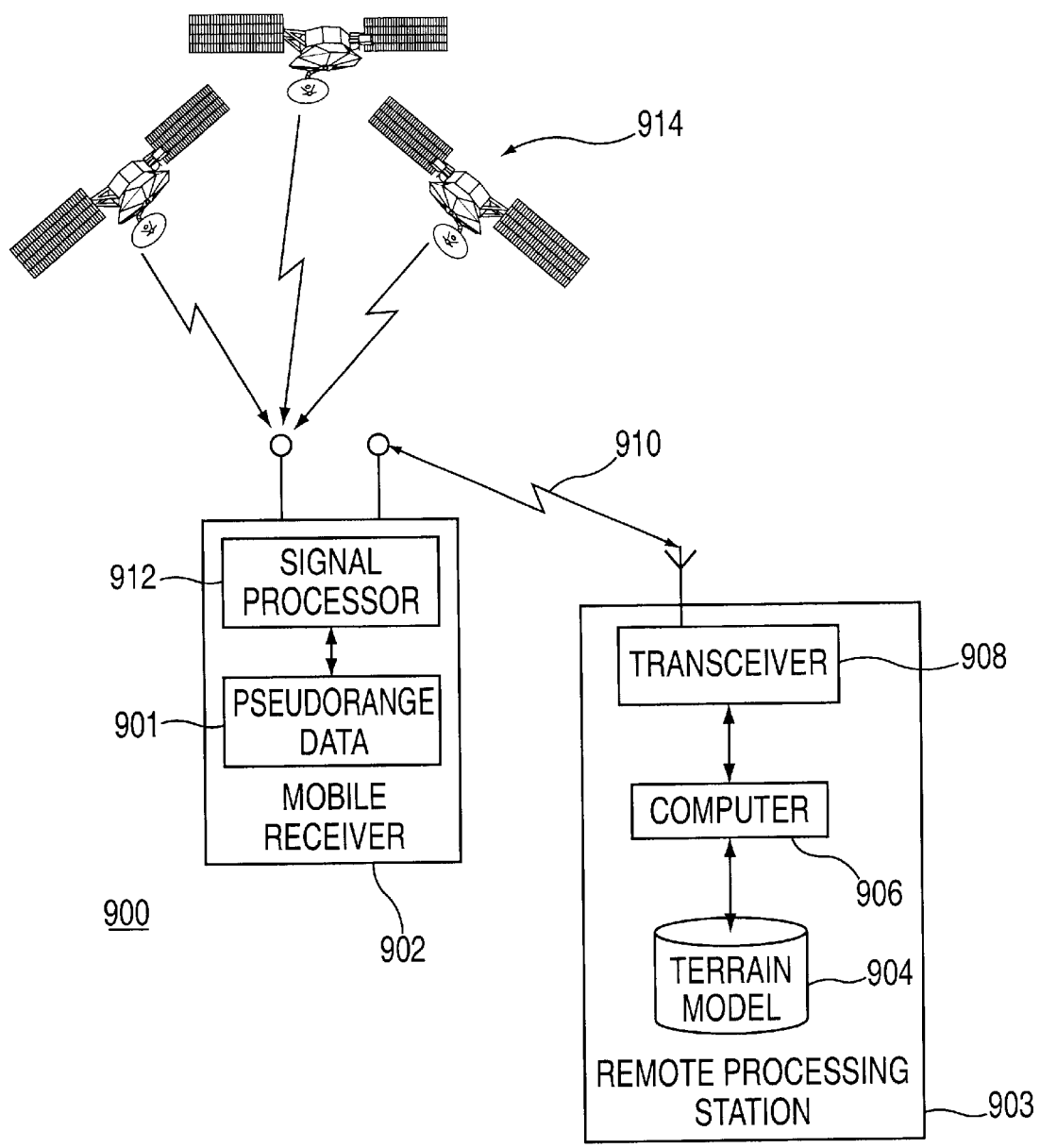
FIG. 9 depicts a block diagram of yet another embodiment of the present invention.

FIG. 9 illustrates another alternate embodiment of positioning system 900 where positions are computed in a post processing step. In this case, pseudorange data 901 from the satellites 914 is collected by a signal processor 912 and stored in the portable mobile device 902. At some subsequent time, the pseudorange data 901 is transferred (e.g., through a file transfer operation) to a remote processing station 903. The remote processing station 903 comprises a transceiver 908, a computer 906 and a terrain model 904. The transceiver 908 receives the pseudorange data file fromteh wireless link 910. The process of determining position using the terrain model 904 occurs in the computer 906 of the remote processing station 903 using the method 500 described with respect to FIG. 5. The position information may then be relayed to the mobile receiver 902 or transferred to some other user of the position information.

After considering the following description, those skilled in the art will clearly realize that the teachings of the invention can be readily utilized in any GPS System, or alternatively any positioning system (terrestrial-based or satellite-based) utilizing transmitters and receivers.

Although various embodiments which incorporate the teachings of the present invention have been shown and described in detail herein, those skilled in the art can readily devise many other varied embodiments that still incorporate these teachings.

What is claimed is:

1. A method for computing position comprising:
   supplying pseudorange measurements that approximate the distance from a location to a plurality of global positioning system (GPS) satellites;
   determining a set of possible positions using said pseudorange measurements; supplying a terrain model; and
   computing a three-dimensional position by identifying an intersection of said set of possible positions and a surface defined by said terrain model.

2. The method of claim 1, wherein said pseudorange measurements are computed within a GPS receiver.

3. The method of claim 1, wherein said computing includes using said terrain model to estimate altitudes at latitude and longitude values derived from said pseudorange measurements.

4. The method of claim 1, wherein said identifying step further comprises:
   executing a bisection process for identifying said intersection.

5. The method of claim 1, wherein said pseudorange measurements are derived utilizing signals from three satellites.

6. An apparatus for computing position information of a receiver, the apparatus comprises:
   a positioning module that derives a plurality of pseudorange measurements to produce a set of possible positions;
   a database containing a terrain model; and
   a position processor that derives three-dimensional position by identifying an intersection of said set of possible positions and a surface defined by said terrain model.

7. The apparatus of claim 6, wherein said position processor uses said terrain model to estimate altitudes at latitude and longitude values derived from said pseudorange measurements.

8. The apparatus of claim 6, wherein the positioning module, database and position processor are located in a mobile receiver.

9. The apparatus of claim 6, wherein said positioning module is located in a mobile receiver and said position processor and database are located in a remote processing station, and a wireless communications link couples the mobile receiver to the remote processing station.

10. The apparatus of claim 6 wherein the positioning module computes pseudoranges for at least three global positioning system satellites.

11. Apparatus for computing position comprising:

means for supplying pseudorange measurements that approximate the distance from a location to a plurality of global positioning system (GPS) satellites;

means for determining a set of possible positions using said pseudorange measurements;

means for supplying a terrain model; and means for computing a three-dimensional position by employing a means for identifying an intersection of said set of possible positions and a surface defined by said terrain model.

12. The apparatus of claim 11, wherein said pseudorange measurements are computed within a GPS receiver.

13. The apparatus of claim 11, wherein said computing means operates without an assumed altitude.

14. The apparatus of claim 11, wherein said identifying means further comprises:

means for executing a bisection process for identifying said intersection.

15. The apparatus of claim 11, wherein said pseudorange measurements are derived utilizing signals from three satellites.

* * * * *

UNITED STATES PATENT AND TRADEMARK OFFICE
CERTIFICATE OF CORRECTION

PATENT NO. : 6,590,530 B2
DATED : July 8, 2003
INVENTOR(S) : Frank van Diggelen and Charles Abraham It is certified that error appears in the above-identified patent and that said Letters Patent is hereby corrected as shown below:

Title page,
Item [56], References Cited, U.S. PATENT DOCUMENT, please change "5,087,919" to -- 5,097,919 --.

Column 8,
Line 11, please change "fromteh" to -- from the --.
Line 33, beginning with "supplying a terrain model" should be a new paragraph.

Signed and Sealed this

Twenty-third Day of September, 2003

JAMES E. ROGAN
*Director of the United States Patent and Trademark Office*